No. 862,136. PATENTED AUG. 6, 1907.
W. P. COKER.
AXLE SPINDLE.
APPLICATION FILED AUG. 28, 1906.

WITNESSES:

Willie P. Coker,
INVENTOR.
By C. A. Snow & Co.
ATTORNEYS

UNITED STATES PATENT OFFICE.

WILLIE P. COKER, OF MOUNTAIN VIEW, OKLAHOMA TERRITORY.

AXLE-SPINDLE.

No. 862,136.   Specification of Letters Patent.   Patented Aug. 6, 1907.

Application filed August 28, 1906. Serial No. 332,400.

*To all whom it may concern:*

Be it known that I, WILLIE P. COKER, a citizen of the United States, residing at Mountain View, in the county of Kiowa and Territory of Oklahoma, have invented a new and useful Axle-Spindle, of which the following is a specification.

This invention has relation to axle spindles and it consists in the novel construction and arrangement of its parts as hereinafter shown and described.

The object of the invention is to provide a spindle with a sleeve which is adapted to be turned or rotated upon the same so that as the under side thereof becomes flattened or worn from use, the said sleeve may be turned so as to present a rounded portion of the surface thereof to the bearing surface of the hub boxing. The sleeve is maintained upon the spindle by means of a nut which engages the same thread as that engaged by the hub nut. The said sleeve is retained against rotary movement by means of shoulders or projections formed at the larger end of the spindle and which enter corresponding recesses formed at the inner end of the said sleeve.

Figure 1:
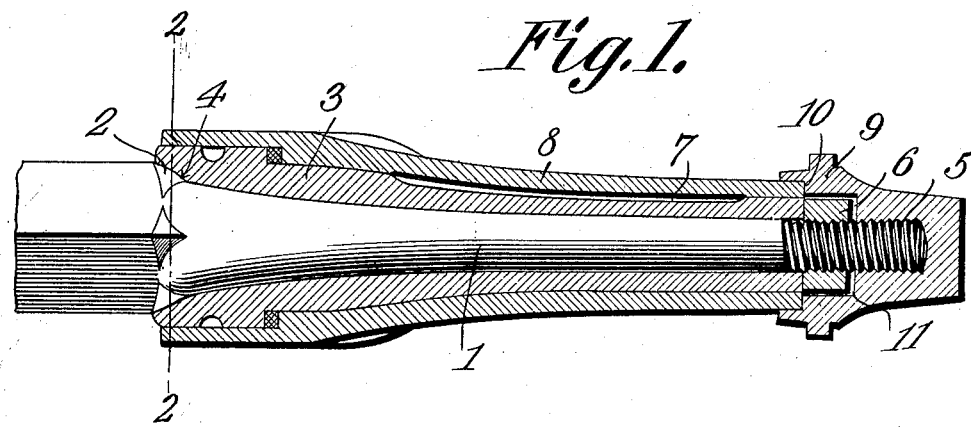
Figure 2:
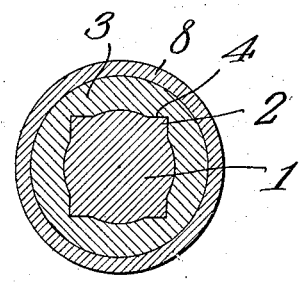

In the accompanying drawing:—Figure 1 is a side elevation of the spindle showing the sleeve and hub boxing in section. Fig. 2 is a transverse sectional view of the parts cut on line 2, 2 of Fig. 1.

The spindle 1 is provided at its inner or larger end with the shoulders or projections 2, 2. The said spindle fits snugly within the sleeve 3, said sleeve having at its inner end the recesses 4 which receive the shoulders 2 and retain the said sleeve from rotary movement with relation to the spindle 1. The outer end of the said spindle is screw threaded in the usual manner as at 5 and the nut 6 engages the said thread 5. The diameter of the nut 6 is equivalent to or less than the diameter of the outer end of the sleeve 3. The said sleeve is provided with the usual lubricant groove 7. The hub boxing 8 receives the said sleeve 3 and the hub nut 9 engages the thread 5 of the spindle 1 and is provided with the shoulder 10 which bears against the outer end of the hub box 8. The said nut 9 is also provided with a recess 11 which receives the nut 6.

From the foregoing description it is obvious that as the sleeve 3 wears or becomes flattened upon its under surface, due to friction with the hub boxing 8 the nut 6 may be removed and the sleeve 3 slipped longitudinally of the spindle 1 until the recesses 4 are beyond the shoulders 2 when the said sleeve 3 may be partially rotated and the recesses 4 reëngaged with the shoulders 2, thus bringing another portion of the surface of the sleeve 3 directly under the lower surface of the spindle 1. Also the sleeve 3 when it is worn out may be removed entirely and a new sleeve of similar design substituted therefor.

Having described my invention what I claim as new and desire to secure by Letters Patent is:—

A device such as described comprising a spindle having a threaded end, a sleeve receiving said spindle, means for retaining said sleeve in several different positions against rotation upon the spindle, a nut engaging the thread of the spindle and bearing directly against the end of the sleeve, the diameter of said nut being less than the diameter of the adjacent end of the sleeve, a hub box journaled upon said sleeve and having its outer end flush with the outer end of the latter, a hub nut engaging the thread of the spindle and having a recess which receives said nut and which is of greater depth than the thickness of the nut, said hub nut bearing directly against the end of the hub box.

In testimony that I claim the foregoing as my own, I have hereto affixed my signature in the presence of two witnesses.

WILLIE P. COKER.

Witnesses:
SAMUEL J. WARD,
DAVID T. VAN KIRK.